United States Patent
An et al.

(10) Patent No.: US 6,807,053 B2
(45) Date of Patent: Oct. 19, 2004

(54) COMPUTER WITH BUILT-IN TYPE SPEAKERS

(75) Inventors: Byeong-Duk An, Osan (KR); Lai-O Kang, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 10/245,294

(22) Filed: Sep. 18, 2002

(65) Prior Publication Data

US 2003/0058611 A1 Mar. 27, 2003

(30) Foreign Application Priority Data

Sep. 26, 2001 (KR) .......................................... 2001/59722

(51) Int. Cl.⁷ ................................................ G06F 1/16
(52) U.S. Cl. .................... 361/683; 361/685; 361/686; 381/300; 381/331
(58) Field of Search ................. 361/680–686, 361/752, 784, 785, 787; 439/78, 81, 289, 329, 862; 381/300–304, 334–336, 386–388; 181/177, 179, 182, 196, 198; 312/223.2

(56) References Cited

U.S. PATENT DOCUMENTS

| | | | |
|---|---|---|---|
| 5,646,820 A | | 7/1997 | Honda et al. ............... 361/683 |
| 5,668,882 A | * | 9/1997 | Hickman et al. ............ 381/300 |
| 5,706,168 A | * | 1/1998 | Erler et al. .................. 361/685 |
| 5,715,139 A | * | 2/1998 | Nakajima ..................... 361/683 |
| 5,847,922 A | | 12/1998 | Smith et al. ................. 361/685 |
| 5,917,695 A | | 6/1999 | Youn ........................... 361/683 |
| 6,061,460 A | | 5/2000 | Seo ............................. 381/388 |
| 6,491,552 B2 | * | 12/2002 | Horikoshi et al. ........... 439/862 |
| 6,597,794 B2 | * | 7/2003 | Cole et al. ................... 381/333 |

* cited by examiner

Primary Examiner—Michael Datskovsky
(74) Attorney, Agent, or Firm—Fleshner & Kim, LLP

(57) ABSTRACT

A portable computer with built-in type speakers is disclosed in which a speaker or speaker holder is mounted at inside a main body of a computer and a sounding part of the speaker is installed pointing in a direction toward the ground or support surface where a main body of the computer is placed. Since the speaker is installed at a lower portion of the main body of the computer and the sounding part of the speaker is installed directed toward the ground, a phenomenon that the sound discharge hole is interfered due to an external factor can be prevented and a sound quality is prevented from degradation.

25 Claims, 6 Drawing Sheets

COMPUTER WITH BUILT-IN TYPE SPEAKERS

BACKGROUND OF THE INVENTION

1. Field of the Invention

The present invention relates to a portable type computer, and more particularly, to a portable computer with built-in type speakers.

2. Background of the Related Art

With the development of the computer and Internet technology, computer instruments and communication instruments have made a remarkable progress, and computer use is rapidly increasing. As the capacity is increased and a wireless communication is available in line with a development of technology, more computer users are generated.

Computers can be classified into a desk-top computer that is used in one location such as on a desk at home or in an office and a notebook (portable or lap-top) computer that is portable and can be used while travelling. In order to discharge various sounds generated in computers, the computers include a speaker. In related art notebook computers, a speaker is installed pointing in an upward direction within a main body of the computer, and a sound discharge hole is formed at an upper surface or front surface of the computer main body to discharge a sound.

As described above, the related art computers with built-in type speakers have various disadvantages. If the sound discharge holes are formed at the upper surface of the computer main body and the sound is discharged upwardly, when a user puts his/her hands on the keyboard to use the keyboard, the sound discharge holes are covered up by the hands or wrists of the operator, which degrades the sound quality. Also, when the sound discharge holes are formed at the upper or front surface of the computer main body, dust can easily infiltrate and degrade the performance and sound quality of the speaker. In addition, when the sound discharge holes are formed in the upper or front surface, a water-proof process is difficult and if a drink such as coffee is spilled, serious damage can be caused to the speaker.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a portable computer with built-in speakers directed downward.

Another object of the present invention is to provide a portable computer with built-in speakers directed downward toward sound discharge holes in a bottom surface of a body module so that a life span of the speaker is increased.

Another object of the present invention is to provide a portable computer with built-in speakers directed downward so that the speaker is directed toward a recess in the bottom surface of the main body.

Another object of the present invention is to provide a computer with built-in type speakers with an enhanced sound quality and lasting quality by increasing a resistance to dust and liquid and component interference by installing a sound part of a speaker to point in a downward direction.

Another object of the present invention is to provide a computer with built-in type speakers with an attractive exterior design by forming sound discharge holes at a lower surface of a main body of a computer.

To achieve at least the above objects and other advantages in a whole or in part and in accordance with the purpose of the present invention, as embodied and broadly described herein, there is provided a computer with built-in type speakers in which a speaker is mounted inside a main body of a computer and a sounding part of the speaker is installed pointing in a downward direction.

To further achieve at least the above objects and other advantages in a whole or in part and in accordance with the purpose of the present invention, as embodied and broadly described herein, there is provided a portable computer with built-in type speakers that includes a first module that has an upper surface, a bottom surface opposing the upper surface and a front surface extending therebetween, a second module that has a display unit that displays data, wherein the second module is supported by the first module to rotate between a first position covering the upper surface of the first module and a second position exposing the upper surface of the first module, and a speaker mounted within the first module to face the bottom surface.

To further achieve at least the above objects and other advantages in a whole or in part and in accordance with the purpose of the present invention, as embodied and broadly described herein, there is provided a portable computer that includes a main body housing an input device and a main printed circuit board, and a speaker mounted inside the main body coupled to the main printed circuit board, wherein a sounding part of the speaker is installed pointing in a downward direction.

To further achieve at least the above objects and other advantages in a whole or in part and in accordance with the purpose of the present invention, as embodied and broadly described herein, there is provided a portable computer that includes a main body housing a keyboard, a display body rotatably supported by the main body, and a speaker holder fixed inside the main body, wherein the speaker holder includes a speaker mount that attaches to a backside of a sound emitting portion of a speaker, wherein the speaker mount faces a bottom surface of the main body.

To further achieve at least the above objects and other advantages in a whole or in part and in accordance with the purpose of the present invention, as embodied and broadly described herein, there is provided a method of assembling a portable computer that includes providing a cover body with a display unit rotatably supported by a main body that includes a main circuit board, and installing a speaker in the main body facing a bottom surface of the main body.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
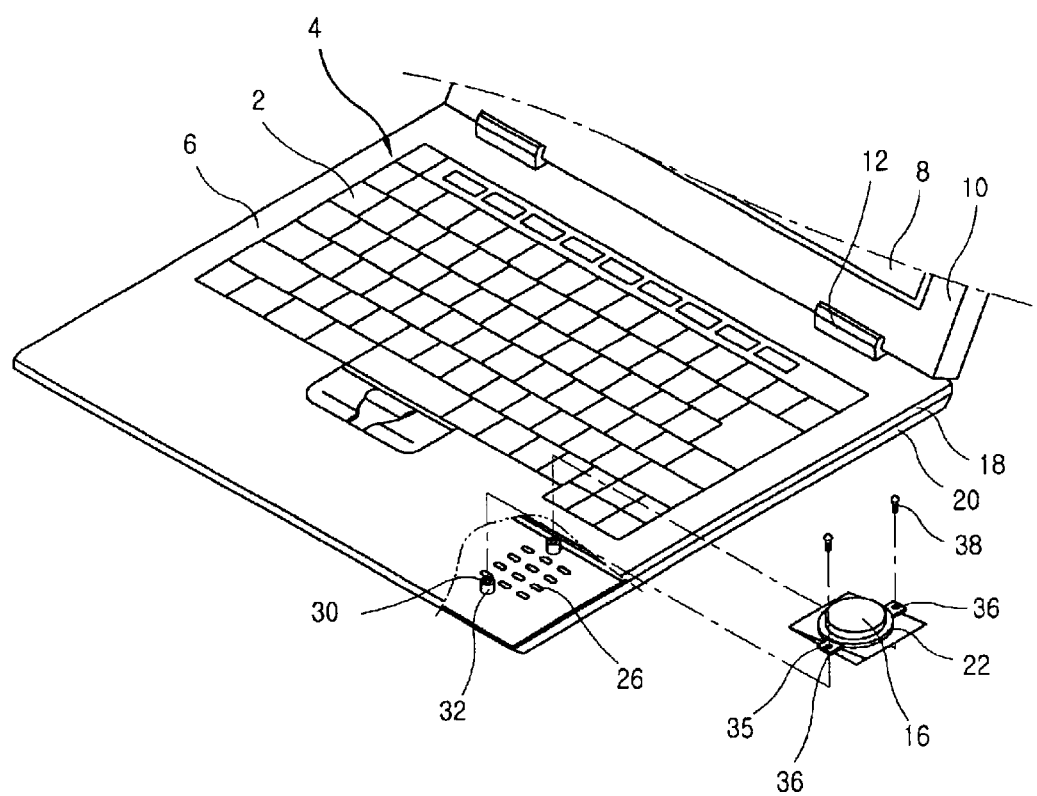
FIG. 1 is a diagram showing a partial cut-away exploded perspective view of exemplary structure for a speaker installed in a notebook computer in accordance with a preferred embodiment of the present invention.
Figure 2:
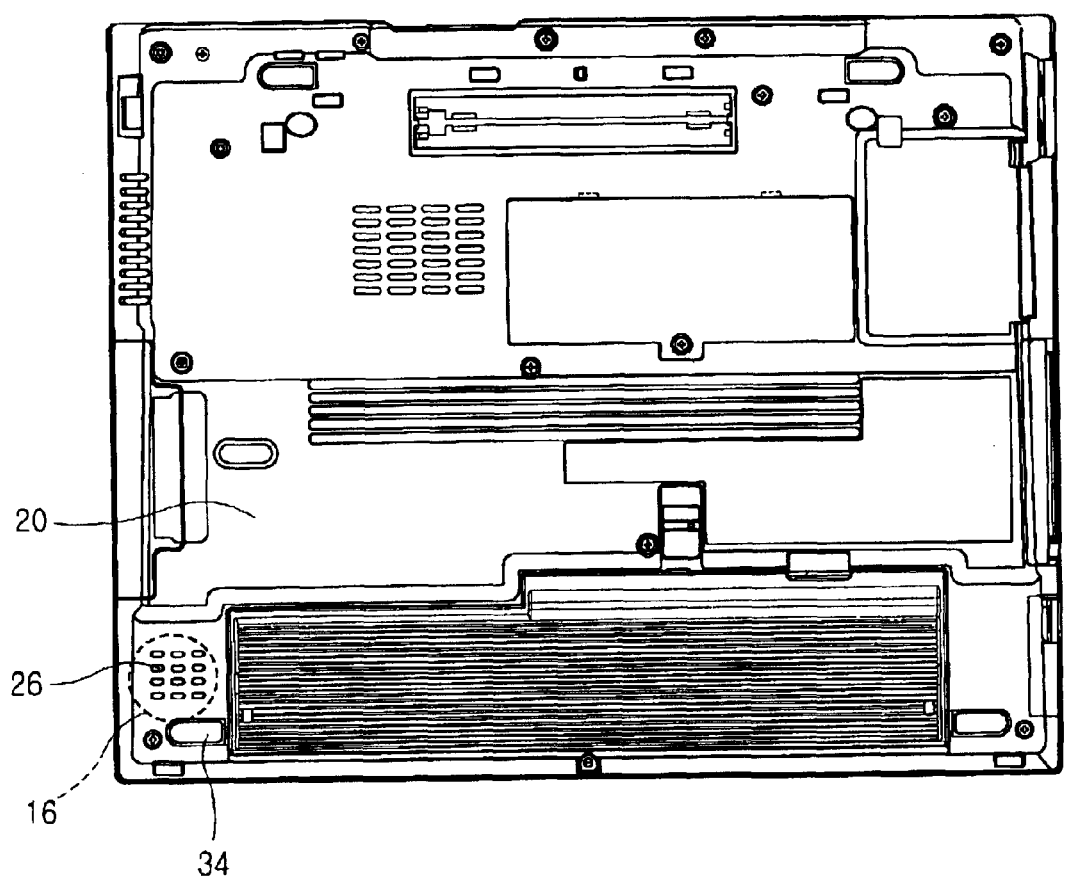
FIG. 2 is a diagram showing a bottom of a notebook computer in accordance with a preferred embodiment of the present invention.

Reference will now be made in detail to preferred embodiments according to the present invention, examples of which are illustrated in the accompanying drawings. FIG. 1 is a diagram showing an exploded partial cut-away perspective view of structure for a speaker installed in a notebook or portable computer in accordance with a first preferred embodiment of the present invention. FIG. 2 is a diagram showing a bottom surface of the notebook computer of FIG. 1.

Preferred embodiments of a notebook computer with built-in type speakers according to the present invention can include a main body 6 having a keyboard 4 with a plurality of input keys 2 for inputting various information and a cover 10 coupled to the main body 6 in a manner of being moveable between an open position and a closed position by a hinge 12 or the like. In the closed position, the cover 10 covers the keyboard 4 and in the open position the keyboard 4 is accessible for use. The cover 10 has a display such as an LCD 8 for displaying various information generated using the computer. A speaker 16 is installed pointing in a downward direction in the main body 6 and discharges various sounds generated from the notebook computer.

The main body 6 preferably includes a deck case 18 and a bottom case 20 that are assembled to form a prescribed enclosed space therebetween. The keyboard 4 is preferably mounted on the deck case 18. A main board (not shown) is installed inside the main body 6 to process various information for the notebook computer. The speaker 16 is coupled to the main board (not shown).

Figure 3:
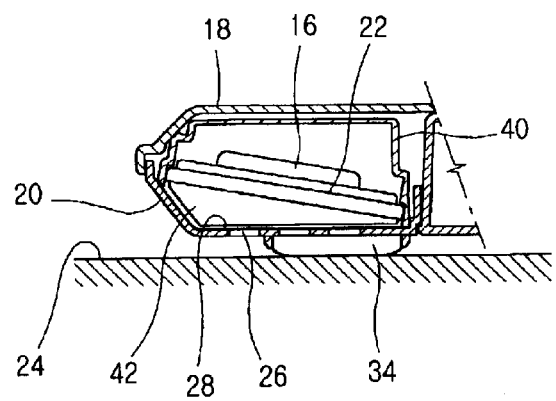
FIG. 3 is a diagram showing a partial cross-sectional view of a speaker installation structure of a notebook computer in accordance with a preferred embodiment of the present invention.

FIG. 3 is a partial cross-sectional view showing another exemplary speaker installation structure of the notebook computer in accordance with the present invention. The speaker installation structure of FIG. 3 can be used with the notebook computer of FIGS. 1–2. As shown in FIG. 3, a speaker 16 is mounted in the main body 6 and preferably fixed to the bottom case 20 (e.g., ribs 32) so that a sounding part 22 of the speaker 16 is directed downwardly. The speaker 16 is preferably mounted in a preset location near a marginal edge or perimeter of the bottom surface of the bottom case 20.

That is, the speaker installation structure forces a sound generated from the speaker 16 is toward a ground 24 on which the notebook computer rests and passes through the bottom case 20 before being transferred to a user. Preferably, a plurality of sound discharge holes 26 are formed at (e.g., one side) the bottom case 20 corresponding to the speaker 16 to discharge the sound generated from the speaker 16 to the ground 24. As shown in FIGS. 1–3, the speaker 16 is preferably rigidly mounted in the main body 6.

A plurality of fixing ribs 32 with bolt engaging holes 30 are formed to be protruded for a certain height from the bottom surface of the bottom case 20, so that the speaker 16 can be mounted to the bottom surface 28 enclosing a prescribed space relative to the bottom surface 28 of the bottom case 20.

A foot 34 having a certain height is mounted at the bottom surface of the bottom case 20 so that desired distances can be maintained between the sound discharge holes 26 and the ground 24 on which the notebook computer is placed. That is, the foot 34 preferably supports the notebook computer and obtains a space to transmit a sound discharged through the sound discharge hole 26 outwardly. However, the present invention is not intended to be so limited.

Figure 6:
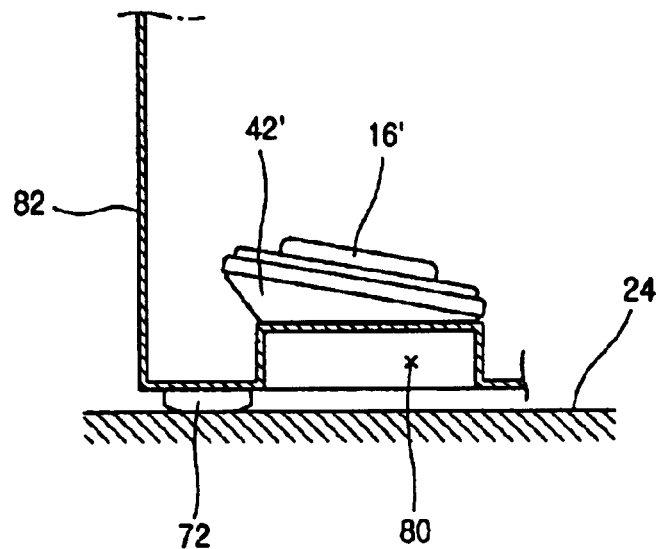
FIG. 6 is a diagram showing a partial sectional view of an exemplary structure for a speaker installed at the computer having a prescribed relationship with a recess in a bottom surface of the main body of the computer.
Figure 7:
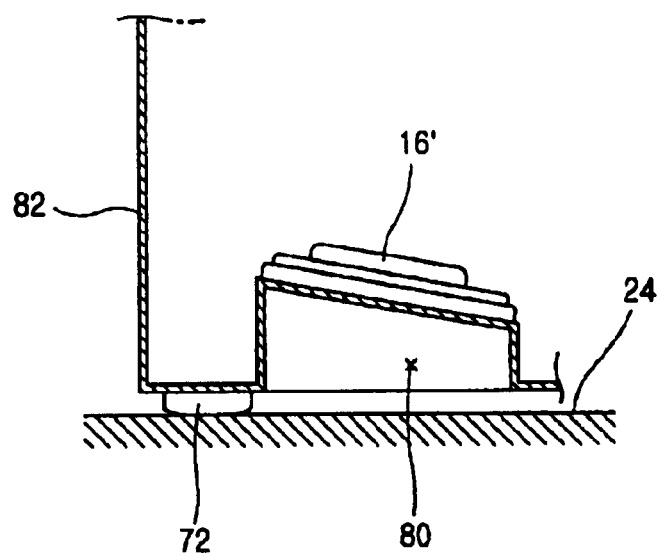
FIG. 7 is a diagram showing a partial sectional view of an exemplary structure for a speaker installed at the computer having a prescribed relationship with a recess in a bottom surface of the main body of the computer.
Figure 8:
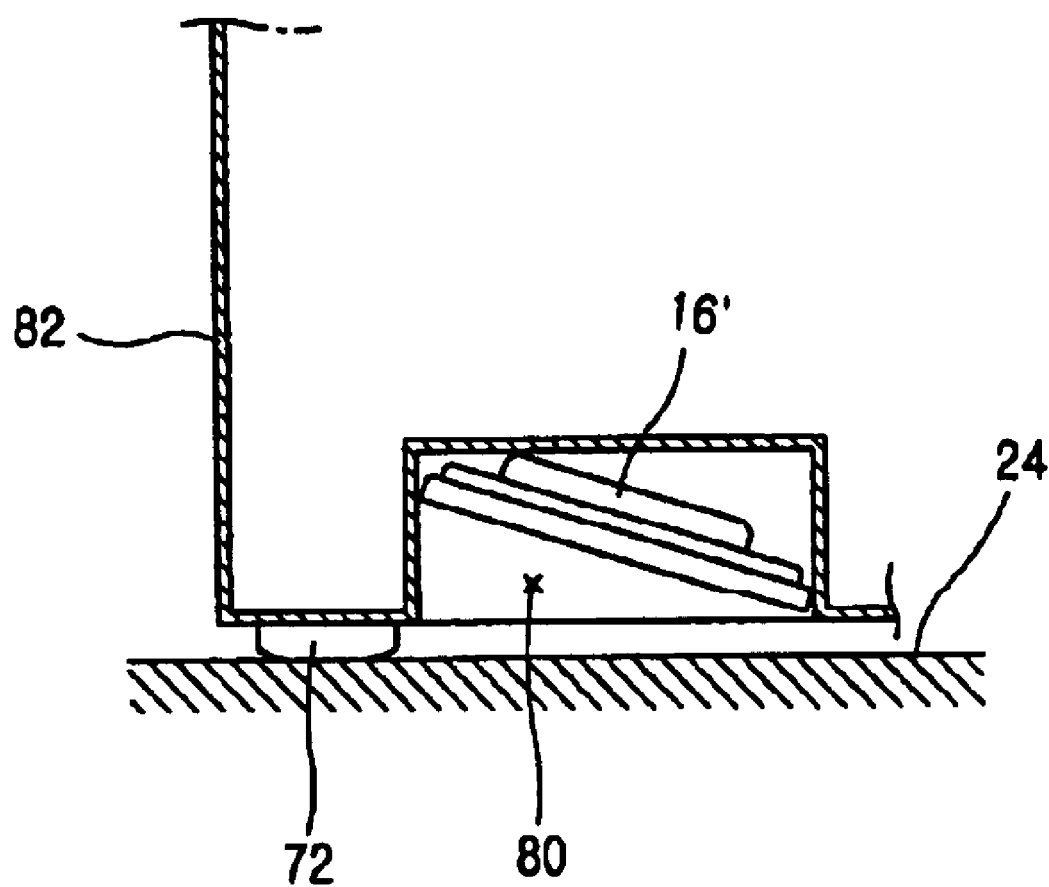
FIG. 8 is a diagram showing a partial sectional view of an exemplary structure for a speaker installed at the computer installed in a recess in a bottom surface of the main body of the computer.

Alternatively, the bottom surface 28 of the bottom case 20 that includes the sound discharge holes 26 can contain a recess or the like corresponding to the speaker 16. In this case, the recess would maintain the desired distance between the speaker 16 or the bottom surface 28 and the ground 24. The ground 24 representatively designates a table, a desk or the like on which the notebook computer can be placed for use. FIGS. 6–8 are diagrams showing exemplary structures for supporting a speaker 16' installed at the computer that have a prescribed spatial relationship corresponding to a recess 80 in a bottom case 82 that includes sound discharge holes. For example, as shown in FIG. 6 the speaker 16' can optionally include a blocking plate 42'. Further, in FIG. 7, the recess has a slanted upper surface although the present invention is not intended to be so limited as a flat or steeper incline can be used.

The speaker 16 is preferably insertedly fixed in a speaker holder 40. The speaker holder 40 preferably includes blocking plates 42 and an engaging bracket 36 with a plurality of bolt holes 35 that are preferably mounted in a circumferential direction at the speaker 16 and engaged by a bolt 38, screw or the like to the fixing rib 32 formed at the bottom case 20 so that the sounding part 22 can be directed downwardly. As shown in FIG. 1, the engaging brackets 36 and fixing ribs 32 are in a middle portion of the speaker 16 assembly. However, the present invention is not intended to be so limited.

The speaker holder 40 is opened at its bottom surface so that the sounding part 22 at the opened inner circumferential surface of the speaker 16 is exposed into a sound projection space serving as a sound box preferably within the outer circumferential surface of the speaker 16 projecting the engaging bracket 36.

The speaker 16 is preferably disposed tilted at a prescribed angle in a selected direction with the speaker holder 40. That is, a sound is discharged toward the ground from the speaker 16 with a certain angle, exerting a sounding plate effect, to improve a sound quality. The speaker 16 is preferably tilted at a prescribed angle toward the side surface of the main body 6, but also may tilt at a prescribed angle toward the front side or combinations thereof.

The blocking plate 42 is preferably installed in the space between the sounding part 22 and the bottom case 20 in order to prevent a leakage of a sound generated from the speaker 16. As shown in FIGS. 1 and 3, the blocking plate 42 preferably has a wedge shaped triangular form to snugly fit adjacent side and bottom surfaces of the bottom case 20 and/or the main body 6 to preferably improve a sound quality and control the prescribed tilt angle of the speaker 16. As shown in FIG. 3, the blocking plates 42 and the speaker 16 are within the speaker holder 40.

Thus, the blocking plate 42 is preferably formed to extend from the speaker sounding part 22 to enclose a portion of the main body 6 having the sound discharge holes 26 and set the speaker 16 tilt. However, the present invention is not intended to be so limited as the sound box and speaker tilt can be obtained by alternative speaker mountings that fasten the speaker 16 in the main body 6.

Operations of the computer with built-in type speakers in accordance with the first preferred embodiment according to the present invention will now be described. When the user opens the cover 10 of the portable computer for use and inputs desired information to the keyboard 4, the desired information is displayed on the LCD 8 in the cover 10. Further, a sound is outwardly discharged through the speaker 16 installed inside the main body 6 when generated by user actions at the portable computer.

Since the sounding part 22 of the speaker 16 is installed to be directed downwardly at the bottom case 20, the sound generated from the speaker 16 is generated downwardly and discharged to the ground 24 or supporting surface through the sound discharge holes 26 formed at the bottom case 20 and then transmitted outwardly.

At this time, the speaker 16 is preferably installed with a prescribed space relative to the bottom case 20, and the bottom case 20 is preferably supported maintaining a prescribed distance to the ground 24. The sound discharged from the speaker 16 can be reflected or bounced off the ground 24 (e.g., outside the footprint of the main body 6) to the user. Thus, the sound discharged from the speaker 16 is effectively transmitted to the user without being interfered by an external condition. Further, as the speaker 16 tilts, the sound wave directed toward the ground 24 from the speaker 16 preferably has a sounding plate effect caused by the ground 24, so that the sound quality is increased. In addition, the blocking plate 42 installed between the sounding part 22 or a frame holding the sounding part 22 of the speaker 16 and the sound discharge hole 26 prevents leakage of sound to other portions of the main body 6 after being discharged from the speaker 16.

Figure 4:
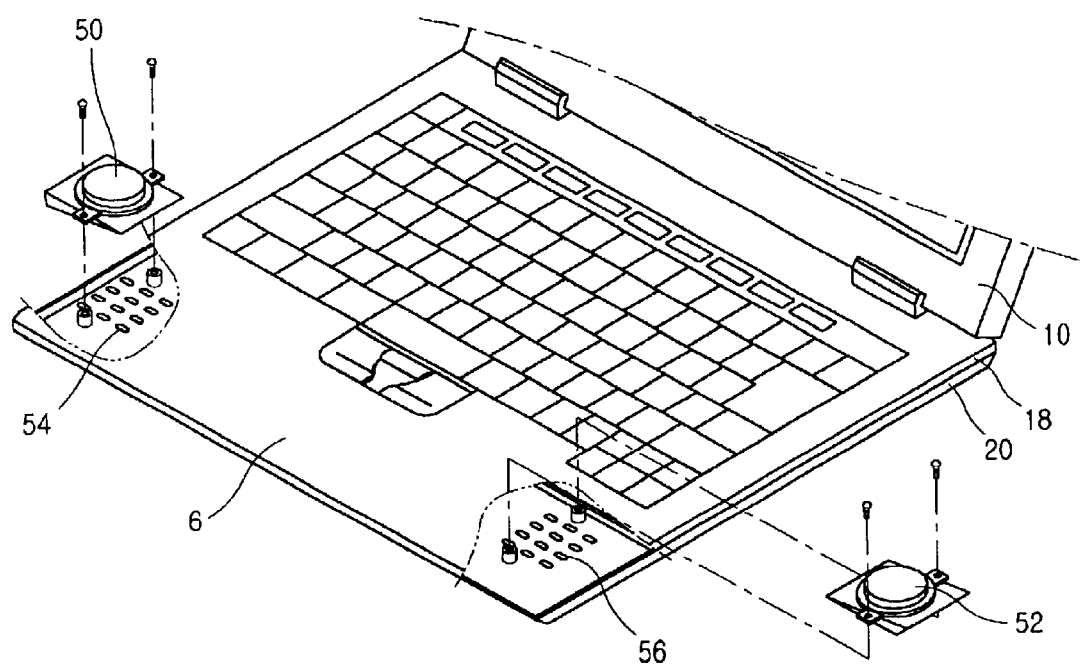
FIG. 4 is a diagram showing a partial cut-away exploded perspective view for a speaker installed in a notebook computer in accordance with another preferred embodiment of the present invention.

FIG. 4 is a diagram showing a perspective view of a speaker installed in a notebook computer in accordance with a second preferred embodiment according to the present invention. As shown in FIG. 4, a notebook computer in accordance with the second embodiment includes speakers 50 and 52 installed at left and right sides facing a bottom surface of the bottom case 20.

That is, sound discharge holes 54 and 56 are respectively formed at both front outward sides of the bottom case 20, and the speakers 50 and 52 are mounted above the sound discharge holes 54 and 56 to define a sound projecton space preferably using the blocking plate 42 and bottom case 20. The speaker installation structure is preferably similar to the first preferred embodiment described above.

Figure 5:
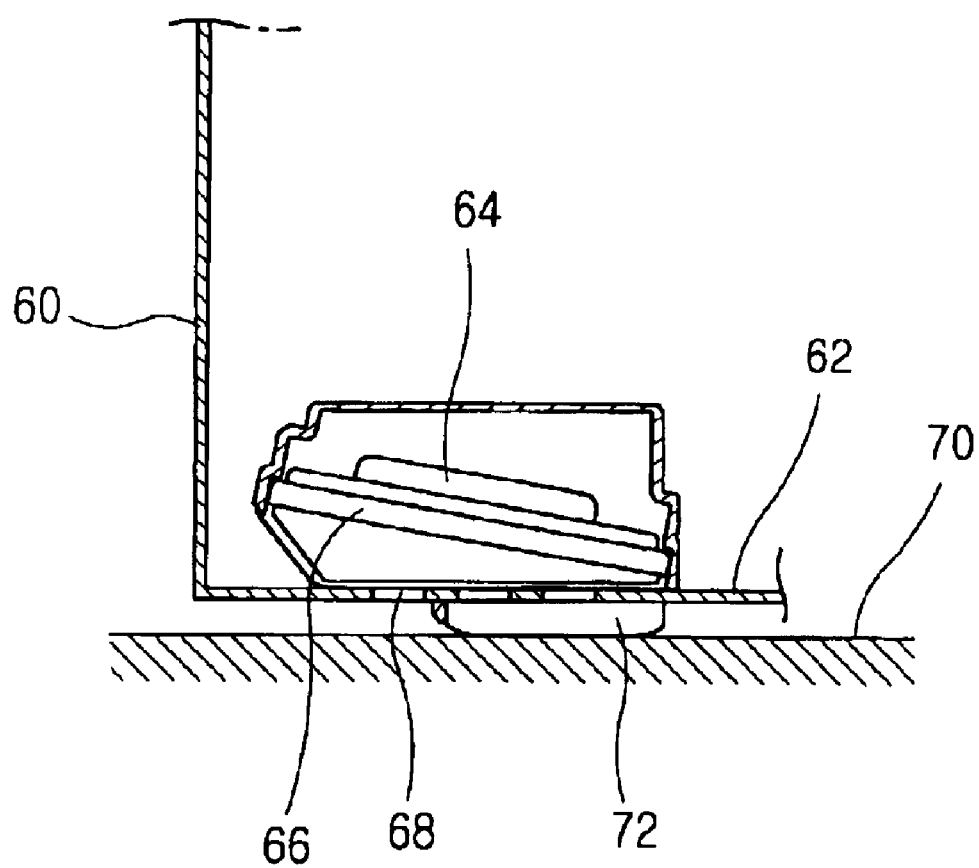
FIG. 5 is a diagram showing a partial sectional view of exemplary structure for a speaker installed at the computer in accordance with still another preferred embodiment of the present invention.

FIG. 5 is a diagram showing a partial sectional view of a speaker installed at a computer in accordance with a third preferred embodiment of the present invention. As shown in FIG. 5, a computer with a built-in type speakers in accordance with the third preferred embodiment has a structure so that a speaker 64 is installed at a bottom surface 62 of a main body 60 of a computer, such as the desk-top computer, and a sounding part 66 of the speaker 64 is directed downwardly. However, in the third preferred embodiment, the predetermined tilt set by the blocking plate is directed toward a front surface of a main body of the desk top computer. Further, a sound projection space is defined by an inner surface of the main body 60, the sounding part 66, the blocking plate and a portion of the bottom surface 62 that has the sound discharge holes 68.

That is, the sound discharge hole 68 is formed at the bottom surface 62 of the computer main body, and the speaker 64 is installed maintaining a prescribed height above and relative angle to the bottom surface 62 of the computer main body 60.

A foot 72 is mounted at the bottom surface of the computer main body 60 maintain a prescribed interval between the bottom surface 62 and a support surface 70. Further, the speaker 64 is form fitted to a speaker holder. Preferably, the speaker installation structure is similar to the first preferred embodiment but spaced within the main body 60. Similarly, the speaker 64 can be offset a prescribed distance from the bottom surface 68.

As described above, a portable computer with built-in type speakers and methods of assembling and operating thereof according to preferred embodiments of the present invention have various advantages. Since the speaker is installed at a lower portion of the main body of the computer and the sounding part of the speaker is installed directed downwardly, a phenomenon that the sound discharge hole is interfered by an external factor can be reduced or prevented and a sound quality is prevented from degradation. Further, when a speaker is installed with a prescribed tilt or angle with respect to the bottom surface of the main body, it serves as a reflecting plate or sounding plate when a sound is discharged through the ground, which can increase a sound quality. Since the speaker is distanced from a microphone within the main body, a howling or interference can be reduced. Moreover, dust collection on the speaker can be reduced or prevented, and the sound quality reduction and instrument durability reduction related to such dust can be similarly reduced or prevented. According to preferred embodiments, when a drink such as coffee is spilled over, possible instrument damage caused when the drink flows into the speaker can be reduced or prevented. Also, as the sound discharge hole for discharging a sound outwardly is formed at a lower portion of the main body, the design of the main body of the computer can be improved, and speaker position interference with other components of the main body can be reduced. In addition, according to preferred embodiments, a prescribed interval can be maintained between sound discharge holes in the bottom surface of the computer and a surface on which it is supported by a foot, locating the speaker in a recess or combinations thereof.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A portable computer with built-in type speakers, comprising:
   a first module that has an upper surface, a bottom surface opposing the upper surface and a front surface extending therebetween;
   a second module that has a display unit that displays data, wherein the second module is supported by the first module to rotate between a first position covering the upper surface of the first module and a second position exposing the upper surface of the first module; and
   a speaker mounted within the first module to face the bottom surface, wherein a blocking plate is installed between a sounding part of the speaker and sound discharge holes in order to prevent sound generated from the speaker from leaking outwardly, wherein the blocking plate is installed between the speaker and the bottom surface having a wedge-shape form tilted at the same angle as the angle at which the speaker is tilted, and wherein the blocking plate is fitted to a bottom case of the first module with upper and lower sides thereof opened.

2. The portable computer of claim 1, wherein the sounding part of the speaker is installed pointing in a direction toward the bottom surface.

3. The portable computer of claim 1, wherein a plurality of sound discharge holes are formed in the bottom surface of the first module to discharge sound generated from the speaker.

4. The portable computer of claim 1, wherein a plurality of feet are coupled to the bottom surface of the first module with a prescribed height to maintain a designated interval between the bottom surface and a support surface for supporting the portable computer.

5. The portable computer of claim 1, wherein a fixing rib bolt-coupled with the speaker is formed at the bottom surface of the first module, protruding with a certain height in the upward direction so that the speaker can be mounted to the fixing rib and maintain a certain distance relative to the bottom surface.

6. The portable computer of claim 1, wherein the speaker tilts at a prescribed angle in a side direction inside the first module.

7. The portable computer of claim 1, wherein the speaker tilts at a prescribed angle in a forward direction inside the first module.

8. The computer of claim 1, wherein the speaker is installed at both sides of the bottom of the first module.

9. The computer of claim 1, wherein the speaker is fixed at an inner side of a speaker holder serving as a sound box, wherein the speaker holder is fixed in the first module.

10. A portable computer, comprising:
    a main body housing an input device and a main printed circuit board; and
    a speaker mounted inside the main body coupled to the main printed circuit board, wherein a sounding part of the speaker is installed pointing in a downward direction, wherein the main body has a recess on a bottom surface, and wherein the speaker is fixed inside the main body in a prescribed spaced relationship to the recess.

11. The portable computer of claim 10, wherein a plurality of sound discharge holes are formed at the bottom surface of the main body to discharge sound generated from the speaker.

12. The portable computer of claim 11, wherein a fixing rib bolt-coupled with the speaker is formed at the bottom surface of the main body, wherein the fixing rib protrudes with a certain height in the upward direction, wherein the speaker is mounted to the fixing rib to maintain certain distance intervals relative to the bottom surface.

13. The portable computer of claim 10, wherein the main body comprises:
    a deck case;
    a bottom case, wherein the deck case and the bottom case are coupled together to enclose a prescribed space therebetween; and
    a plurality of feet mounted on the bottom case to maintain a prescribed spaced relationship with a surface supporting the computer.

14. The portable computer of claim 10, wherein blocking plates are installed between the sounding part of the speaker and the bottom case on opposite sides of the sound discharge holes to reduce outward leaking of sound generated from the speaker.

15. The portable computer of claim 10, wherein the speaker is installed near both forward corners of the main body.

16. The portable computer of claim 10, comprising a cover that includes a display rotatably supported by the main body.

17. A portable computer, comprising:
    a main body housing a keyboard;
    a display body rotatably supported by the main body; and
    a speaker holder fixed inside the main body, wherein the speaker holder includes a speaker mount that attaches to a backside of a sound emitting portion of a speaker, wherein the speaker mount faces a bottom surface of the main body, wherein the main body has a recess on the bottom surface, and wherein the speaker holder is fixed inside the main body in a prescribed spaced relationship to the recess.

18. The portable computer of claim 17, wherein the speaker mount tilts at a prescribed angle in toward one of a front surface and a side surface of the main body.

19. A method of assembling a portable computer, comprising:
    providing a cover body with a display unit rotatably supported by a main body that includes a main circuit board;
    installing a speaker in the main body facing a bottom surface of the main body; and
    installing a blocking plate between the speaker and the bottom surface of the main body having a prescribed-shape form tilted at the same angle as the angle at which the speaker is tilted, wherein the blocking plate is fitted to the bottom surface of the main body with upper and lower sides thereof opened.

20. The method of claim 19, wherein the prescribed shape form is a wedge-shaped form.

21. The portable computer of claim 19, wherein the main body has a recess on the bottom surface, and wherein the speaker is fixed inside the main body in a prescribed spaced relationship to the recess.

22. The portable computer of claim 1, wherein the upper sides open toward the speaker and the lower sides open toward the bottom case.

23. The portable computer of claim 1, wherein the bottom surface has a recess, and wherein the speaker is mounted inside the first module corresponding to the recess.

24. The portable computer of claim 10, wherein a blocking plate is installed between the speaker and the bottom surface having a wedge-shape form tilted at the same angle as the angle at which the speaker is tilted, wherein the blocking plate is fitted to the bottom surface of the main body with upper and lower sides thereof opened.

25. The portable computer of claim 17, wherein a blocking plate is installed between the speaker and the bottom surface having a wedge-shape form tilted at the same angle as the angle at which the speaker is tilted, wherein the blocking plate is fitted to the bottom surface of the main body with upper and lower sides thereof opened.

\* \* \* \* \*